US012627160B2

(12) United States Patent (10) Patent No.: US 12,627,160 B2
McBride et al. (45) Date of Patent: May 12, 2026

(54) LITHIUM ION BATTERY CELL BALANCING SYSTEM AND METHOD, AND A BATTERY CHARGING DEVICE WITH LITHIUM ION BATTERY CELL BALANCING

(71) Applicant: The Noco Company, Glenwillow, OH (US)

(72) Inventors: James P. McBride, Phoenix, AZ (US); Daniel L. Simon, Phoenix, AZ (US); James Richard Stanfield, Glendale, AZ (US)

(73) Assignee: The Noco Company, Glenwillow, OH (US)

( * ) Notice: Subject to any disclaimer, the term of this patent is extended or adjusted under 35 U.S.C. 154(b) by 791 days.

(21) Appl. No.: 17/999,121

(22) PCT Filed: Jun. 2, 2021

(86) PCT No.: PCT/US2021/035328
§ 371 (c)(1),
(2) Date: Nov. 17, 2022

(87) PCT Pub. No.: WO2021/247626
PCT Pub. Date: Dec. 9, 2021

(65) Prior Publication Data
US 2023/0216314 A1 Jul. 6, 2023

Related U.S. Application Data

(60) Provisional application No. 63/033,717, filed on Jun. 2, 2020.

(51) Int. Cl.
*H02J 7/54* (2026.01)
*H01M 10/0525* (2010.01)
(Continued)

(52) U.S. Cl.
CPC ........... *H02J 7/54* (2026.01); *H01M 10/0525* (2013.01); *H01M 10/425* (2013.01);
(Continued)

(58) Field of Classification Search
USPC ......................................... 320/118
See application file for complete search history.

(56) References Cited

U.S. PATENT DOCUMENTS 9,331,500 B2 5/2016 Knitt et al.
2007/0216369 A1 * 9/2007 Chandler ............ H01M 10/482
320/136

(Continued)

FOREIGN PATENT DOCUMENTS

JP 2009-124933 6/2009
JP 2018-170859 11/2018
JP 2019-115088 7/2019

OTHER PUBLICATIONS

Patent Cooperation Treaty, International Search Report and Written Opinion, PCT/US2021/035328, dated Sep. 10, 2021.
(Continued)

*Primary Examiner* — Mohammed Alam
(74) *Attorney, Agent, or Firm* — Jones Day

(57) ABSTRACT

Provided is a lithium ion rechargeable battery charging system with lithium cell balancing, including a lithium ion rechargeable battery and a battery charging device configured for charging the lithium ion rechargeable battery and wherein cell balancing of the lithium ion rechargeable battery cells of the lithium ion rechargeable battery continues for a predetermine period of time once a cell balancing mode begins.

8 Claims, 21 Drawing Sheets

(51) Int. Cl.

| | | |
|---|---|---|
| *H01M 10/42* | (2006.01) | |
| *H01M 10/44* | (2006.01) | |
| *H01M 10/48* | (2006.01) | |
| *H02J 7/61* | (2026.01) | |
| *H02J 7/63* | (2026.01) | |
| *H02J 7/80* | (2026.01) | |
| *H02J 7/96* | (2026.01) | |

(52) U.S. Cl.

CPC ....... *H01M 10/441* (2013.01); *H01M 10/482* (2013.01); *H02J 7/61* (2026.01); *H02J 7/63* (2026.01); *H02J 7/80* (2026.01); *H02J 7/96* (2026.01); *H01M 2010/4271* (2013.01)

(56) References Cited

U.S. PATENT DOCUMENTS

| | | | | |
|---|---|---|---|---|
| 2008/0074080 A1 | 3/2008 | Luo et al. | | |
| 2008/0180059 A1 | 7/2008 | Carrier et al. | | |
| 2009/0243543 A1 | 10/2009 | Kawana et al. | | |
| 2010/0253287 A1* | 10/2010 | Kim | .................... | H01M 10/441 |
| | | | | 320/118 |
| 2012/0032681 A1* | 2/2012 | Fink | .................... | G01R 31/396 |
| | | | | 324/430 |
| 2013/0099726 A1 | 4/2013 | Zhang et al. | | |
| 2013/0207610 A1* | 8/2013 | Hull | ...................... | H02J 7/0016 |
| | | | | 320/136 |
| 2013/0207616 A1 | 8/2013 | Shim | | |
| 2016/0111900 A1* | 4/2016 | Beaston | ................ | H02J 7/0048 |
| | | | | 320/134 |
| 2018/0123357 A1* | 5/2018 | Beaston | .................. | H02J 3/381 |
| 2020/0028368 A1 | 1/2020 | Nook et al. | | |
| 2020/0067324 A1* | 2/2020 | Zou | ................... | H01M 10/0525 |

OTHER PUBLICATIONS

IP Australia, Appl. 2021283208, Examination Report No. 1, Jun. 27, 2023.

IP Australia, Appl. 2024201482, Examination Report No. 1, Nov. 25, 2024.

IP Australia, Appl. 2024201482, Examination Report No. 3, Jul. 8, 2025.

Japan Patent Office, Appl. 2022-573770, Reasons for Refusal, Jun. 18, 2024.

European Patent Office, Appl. 21817992.7, Extended European Search Report, May 28, 2024.

IP Australia, Appl. 2024201482, Examination Report No. 2, Mar. 25, 2025.

Japan Patent Office, Appl. 2022-573770, Reasons for Refusal, Jan. 30, 2024.

Canada Intellectual Property Office, Appl. 3,183,943, Examiner's Report, Jan. 23, 2026.

* cited by examiner

TO

LITHIUM ION BATTERY CELL BALANCING SYSTEM AND METHOD, AND A BATTERY CHARGING DEVICE WITH LITHIUM ION BATTERY CELL BALANCING

CROSS-REFERENCE TO RELATED APPLICATIONS

This application is a National Stage Entry of International Patent Application No. PCT/US2021/035328, filed on Jun. 2, 2021, which claims the benefit of priority to U.S. Provisional Application No. 63/033,717, filed on Jun. 2, 2020, each of which is hereby incorporated by reference in its entirety for all purposes

FIELD

The present invention is directed to a lithium ion battery cell balancing system and method, and a battery charging device comprising a lithium ion battery cell balancing system and/or incorporating the lithium ion battery cell balancing method according to the present invention.

BACKGROUND

Currently, there exists a battery charger for charging a depleted or discharged lithium ion rechargeable battery (e.g. depleted or discharged lithium ion rechargeable vehicle battery). The existing battery charger operates in a manner that if the lithium ion rechargeable battery voltage of the battery charger reaches a cut-off voltage for a Lithium mode (e.g. 14.6V) while the battery charger is delivering current to the depleted or discharged lithium ion rechargeable battery being charged, even during a soft start, the charge current is cut-off and a fuel gauge on the display of the battery charger displays a solid green light (e.g. via a green LED in the fuel gauge), after an appropriate fuel gauge time increment.

Further, the existing battery charger will oscillate between a lithium mode and a stand-by mode during charging operation of the depleted or discharged lithium ion rechargeable battery. Specifically, when charging a lithium ion rechargeable battery with a Battery Management System (BMS) and the lithium ion rechargeable battery cells are unbalanced, the battery charger will oscillate between the lithium mode and the stand-by.

This is caused because the lithium ion rechargeable battery's Battery Management System (BMS) monitors each cell voltage. If a lithium ion rechargeable battery cell gets charged too high, the Battery Management System (BMS) will open the Charge FET to prevent further charging of the particular lithium ion rechargeable battery cell. Meanwhile, an internal resistor in the Battery Management System (BMS) is connected to slowly discharge the lithium ion rechargeable battery cell. The Charge FET will again be closed once the over-voltage lithium ion rechargeable battery cell has discharged to a lower level.

When the Charge FET opens up, a diode is still present which allows a discharge path to the lithium ion rechargeable battery cells. This means that when the battery charger is connected to the lithium ion rechargeable battery, an internal voltage divider resistor network in the battery charger will still sense a voltage at the terminals, and try to drive a charge current. Since the Charge FET in the battery is open, no current is sensed by the charger, and the charger then goes back to Stand-by mode.

Since the battery charger detects the battery voltage, it pols the battery voltage every few seconds to see if a current can be applied. When trying to apply the current, the battery charger goes from Stand-by mode to Lithium mode. The battery charger will oscillate between stand-by mode and Lithium mode until the battery BMS closes the Charge FET.

SUMMARY

The present invention is directed to a lithium ion battery cell balancing system and/or method for charging a depleted or discharged lithium ion rechargeable battery, and a battery charger comprising the lithium battery cell balancing system and/or incorporating the lithium ion battery cell balancing method according to the present invention.

The lithium ion battery cell balancing method comprises or consists of a number of steps for balancing the multiple lithium ion rechargeable battery cells of the lithium ion rechargeable battery, depending on the particular type of battery charger (e.g. Constant Current (CC) type battery charger or Constant Voltage (CV) type battery charger).

The presently described subject matter is also directed to a lithium ion rechargeable battery charging system and/or method for use in a battery charger configured to charge a lithium ion rechargeable battery that has a built in Battery Management System (BMS).

The lithium ion rechargeable battery comprises multiple lithium ion rechargeable battery cells connected together in an electrical series arrangement. The lithium ion rechargeable battery cells can become imbalanced relative to each other due to variations in capacities or loads on the various lithium ion rechargeable battery cells. Specifically, during charging operation the voltages of the lithium ion rechargeable battery cells become different relative to each other.

To keep the lithium ion rechargeable battery cells operating in a safe voltage range, the lithium ion rechargeable battery can include a Battery Management System (BMS). The role of the Battery Management System (BMS) is to monitor the voltages of the lithium ion rechargeable battery cells and open up a Discharge FET, if any of the lithium ion rechargeable battery cells of the lithium ion rechargeable battery becomes undercharged, and to open up a Charge FET, if any of the lithium ion rechargeable battery cells becomes overcharged.

The Battery Management System (BMS) can include a lithium ion rechargeable battery cell balance feature according to the present invention. The Battery Management System (BMS) can monitor each individual lithium ion rechargeable battery cell voltage inside of the lithium ion rechargeable battery. If a particular lithium ion battery cell becomes overcharged, the Battery Management System (BMS) will place a small resistive load across the particular lithium ion rechargeable battery cell to slowly bleed charge off this particular lithium ion rechargeable battery cell. The resistive load on the particular lithium ion rechargeable battery cell is disconnected once the particular lithium ion rechargeable battery cell voltage decreases to a safe threshold.

During cell balancing of a lithium ion rechargeable battery with unbalanced lithium ion battery cells, the Battery Management System (BMS) can open/close the Charge FET numerous times as the internal lithium ion rechargeable battery cells are slowly brought into balance by the Battery Management System (BMS).

For charging a lithium ion rechargeable battery, a final step is to stay in a constant voltage (CV) mode and maintain a Taper Charge Threshold Voltage at the battery charger terminals to allow time for the lithium ion rechargeable battery's internal Battery Management System (BMS) to cell balance. This time is called a Lithium Cell Balance Time, and can be set, for example to 4 hours. However, this time can be programmable, and, for example, and can be adjusted to a different time duration (e.g. 6 hours, 8 hours).

During the Lithium Cell Balance Time, the battery charger is in a constant voltage (CV) mode. During this time, the battery charger needs to be able to distinguish between the lithium ion rechargeable battery's BMS opening the Charge FET verses a user disconnecting a charger cable from the depleted or discharged lithium ion rechargeable battery being charged. If the Charge FET is opened up by the BMS, then the charger must stay in the Lithium Cell Balance mode for the balance of the Lithium Cell Balance Time. If the user disconnects the battery charger from the lithium ion rechargeable battery, the battery charger must go to a Standby mode.

While the lithium ion rechargeable battery is in the Lithium Cell Balance (LCB) mode, the battery charger output current is monitored. If the charge current drops below the minimum detectable current level, then the charger starts checking the battery voltage every second.

To check the lithium ion rechargeable battery voltage, the battery charger internally opens a circuit from the battery charger's constant voltage supply to the lithium ion rechargeable battery, and then measures the lithium ion rechargeable battery voltage. If the lithium ion rechargeable battery voltage has dropped below 10.5V, then the user disconnects the battery charger cables from the lithium ion rechargeable battery, and the battery charger goes to Standby mode. If the lithium ion rechargeable battery voltage is above 10.5V, then the Battery Management System (BMS) Charge FET opens up and the battery charger reconnects the battery charger's constant voltage source to the lithium ion rechargeable battery until the next one (1) second lithium ion rechargeable battery voltage check time interval. If the lithium ion rechargeable battery starts pulling detectable current again, the internal switch remains closed.

It is noted that the battery charger can still measure the lithium ion rechargeable battery voltage (minus a diode drop) when the Charge FET is open because the freewheeling diode provides a current path for the measurement.

There are two (2) modes of Lithium Cell Balancing (LCB). In the first Lithium Cell Balancing (1st LCB) mode when the lithium ion rechargeable battery cells are not far out of balance, the Battery Management System (BMS) will not open up the charge FET during the first Lithium Cell Balancing (1st LCB) mode. In this mode, a constant current (CC) type battery charger just emulates a constant voltage (CV) type battery charger. This is done by using a first soft start current level to charge the lithium ion rechargeable battery until it hits 14.6V. Once it hits 14.6V, it turns off the current and waits for the voltage to drop to 14.4V. Once it hits 14.4V (along with some delay(s)), then it turns the first soft start current back on and repeats. So, basically the constant current (CC) type battery charger emulates the constant voltage (CV) type battery charger by keeping the battery voltage in a tight voltage range of 14.4V to 14.6V.

In the second Lithium Cell Balance (2nd LCB) mode, the lithium ion rechargeable battery cells are out of balance far enough for the Battery Management System (BMS) to open up the charge FET. The battery charger has to detect that the charge FET has opened up verses the user disconnecting the terminals. Since the open charge FET still has a body diode connection, the battery charger can still measure the battery voltage, minus a diode drop. Therefore if the Battery Management System (BMS) opens up the charge FET, but the battery charger can still measure a battery voltage greater than (>) 10.5 volts, it can tell the lithium ion rechargeable battery is still connected. So, next the battery charger has to be able to determine when the charge FET closes again. It does this by polling the lithium ion rechargeable battery impedance every minute. During the polling, the battery charger attempts to force a charge current. If no current is accepted, it knows that the charge FET is still open. Once the charge FET closes, and on the next charger polling attempt, the battery charger will see that the lithium ion rechargeable battery is now accepting current, and will continue charging at the first soft start level until the battery reaches 14.6V or until the Battery Management System (BMS) opens up the charge FET. If 14.6V is reached, it goes into the first Lithium Cell Balancing (1st LCB) mode. If the BMS opens up, it repeats the second Lithium Cell Balancing (2nd LCB) mode.

The above is done either by the first Lithium Cell Balancing (1st LCB) mode, the second Lithium Cell Balancing (2nd LCB) mode, or combined second Lithium Cell Balancing (2nd LCB) mode then first Lithium Cell Balancing (1st LCB) mode for a set time of the Lithium Cell Balancing (LCB) operation.

For the battery charger, for example, 4 hours is selected, but this time is arbitrary. The total time needed for a Battery Management System (BMS) to reach full cell balance is determined by how far the internal lithium ion rechargeable battery cells are out of balance, and what size of balance load is used by the Battery Management System (BMS). Both of these factors are not observable by the battery charger.

DETAILED DESCRIPTION

Figure 1:
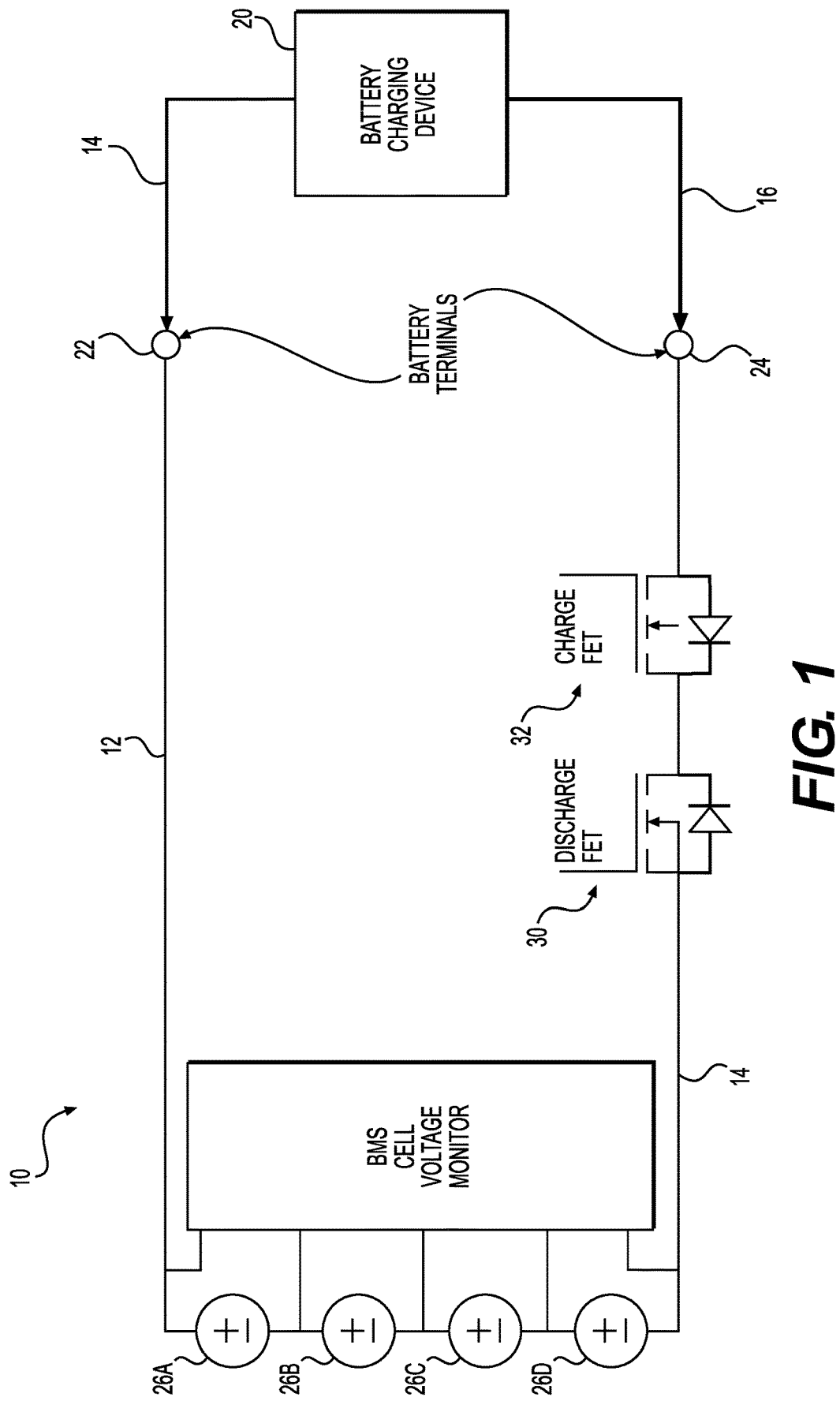
FIG. 1 is a diagrammatic view of a lithium ion rechargeable battery with a Battery Management System (BMS).

A battery charging device 10 comprising a positive battery cable 14 and a negative battery cable 16 are connected to the lithium ion rechargeable battery 20, as shown in FIG. 1. For example, the positive battery cable 12 can be connected to the positive battery terminal 22 of the lithium ion rechargeable battery 20 (e.g. using a positive battery clamp, not shown) and the negative battery cable 14 can be connected to the negative battery terminal 24 of the lithium ion rechargeable battery 20 (e.g. using a negative battery clamp, not shown).

The lithium ion rechargeable battery 20 comprises four (4) lithium ion rechargeable battery cells 26A, 26B, 26C, 26D connected together in electrical series, a Battery Management System (BMS) 28 connected to the four (4) lithium ion rechargeable battery cells 26A, 26B, 26C, 26D, a Discharge FET 30, and a Charge FET 32. The Discharge FET 30 and Charge FET 32 are connected in electrical series with the four (4) lithium ion rechargeable battery cells 26A, 26B, 26C, 26D, as shown in FIG. 1.

Figure 2:
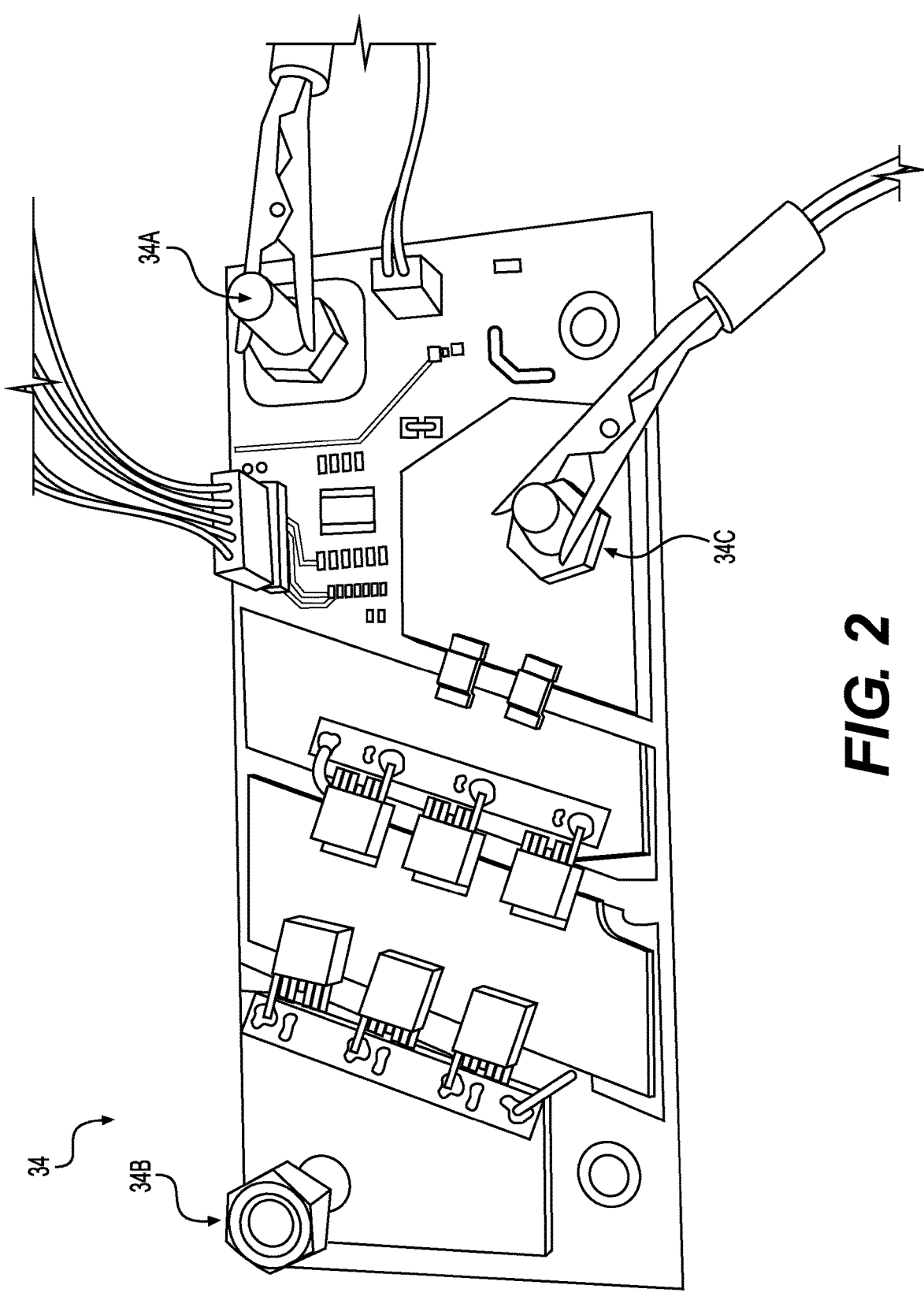
FIG. 2 is a top planar view of the Battery Management System (BMS) showing the BMS connections of the lithium ion rechargeable battery.

The Battery Management System (BMS) 28 comprises a printed circuit board 34, as shown in FIG. 2. The printed circuit board 34 comprises a positive external battery terminal/internal lithium ion rechargeable battery positive battery connection 34A, a negative external battery terminal 34B, and an internal lithium ion negative battery connection 34C.

Figure 3:
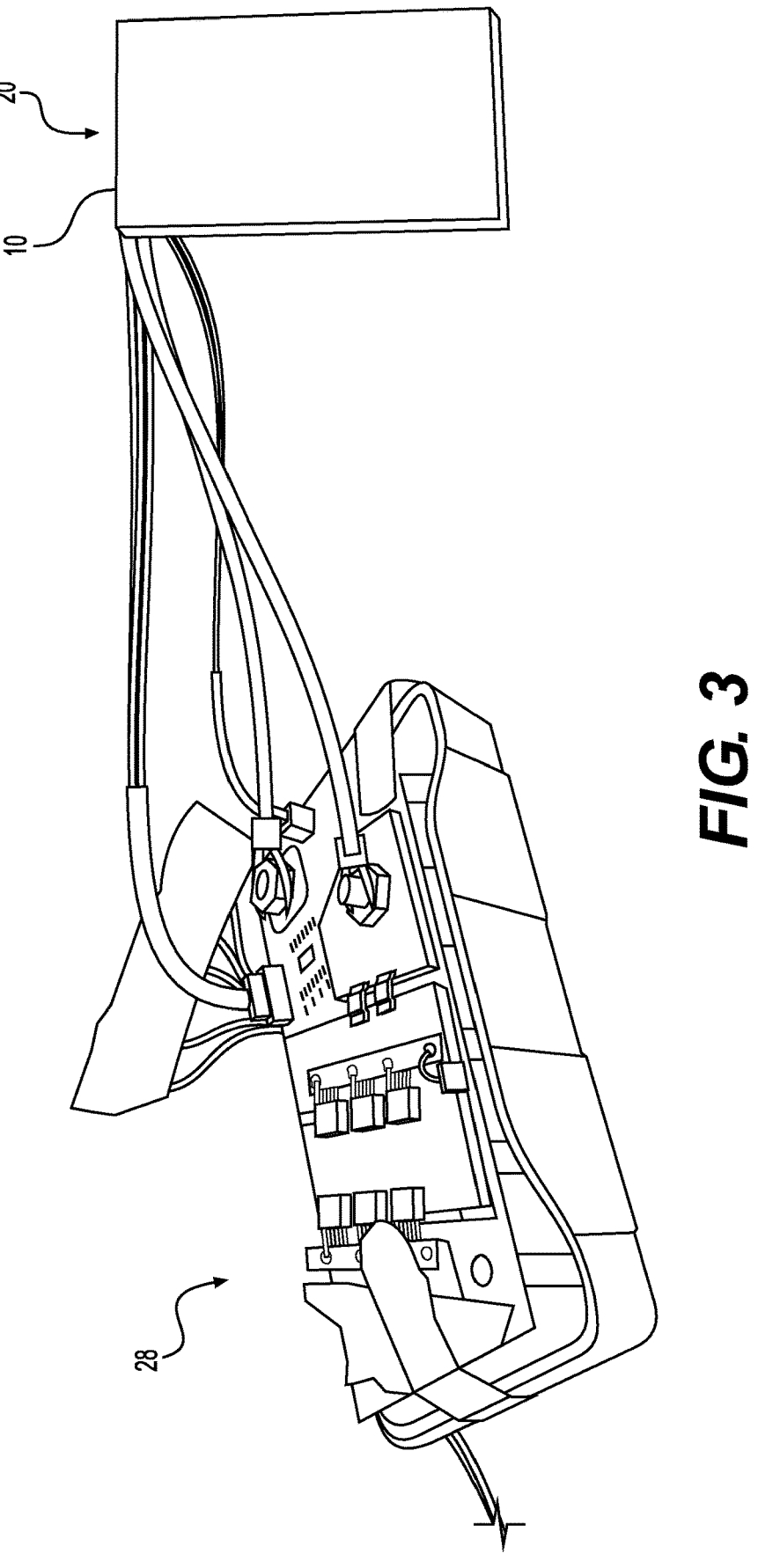
FIG. 3 is perspective view of the Battery Management System (BMS) and lithium ion rechargeable battery showing the BMS connection with the lithium ion rechargeable battery.
Figure 4:
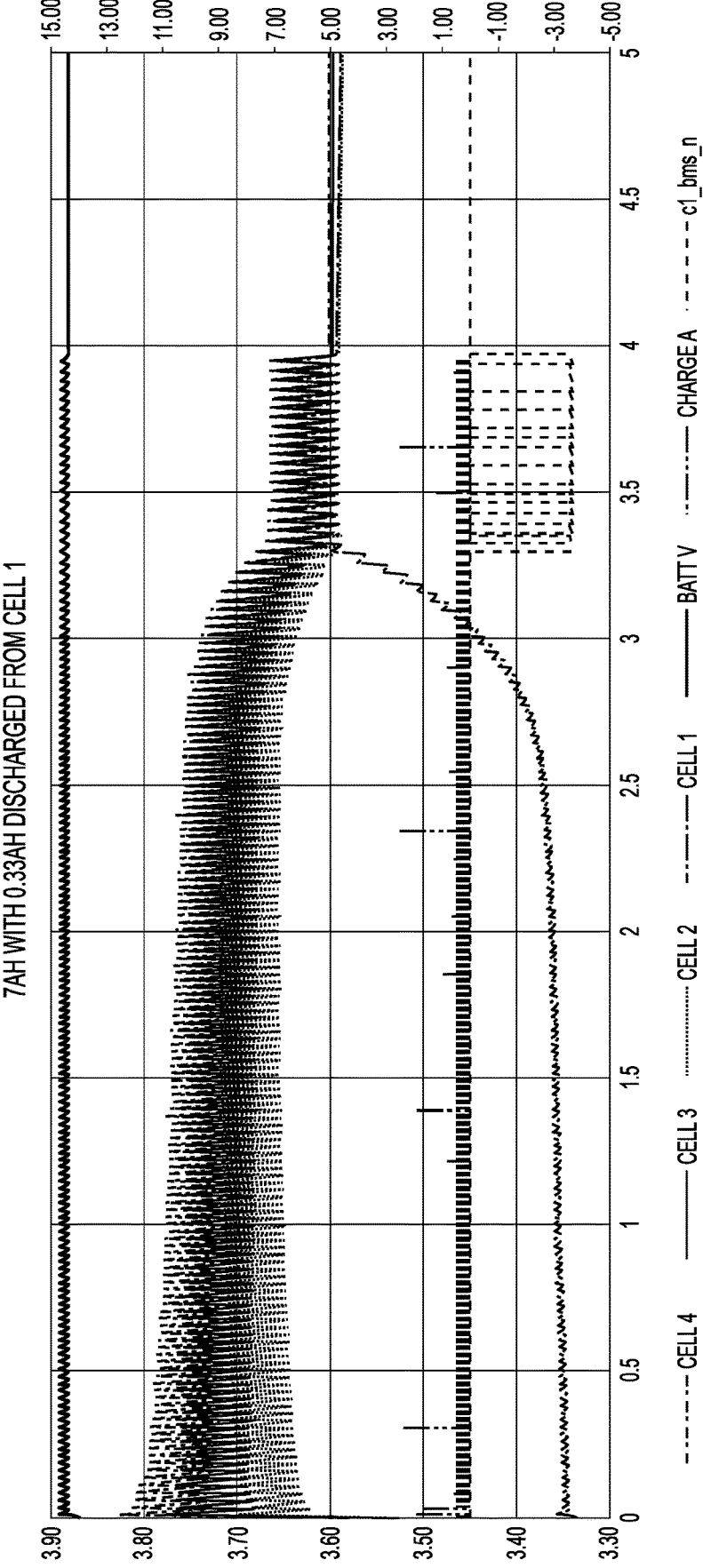
FIG. 4 is a graph showing G2 7 AH (amp hour) Battery with 0.33 AH discharged from Cell 1 (7 AH with 0.33 AH Discharged from Cell 1).
Figure 4:
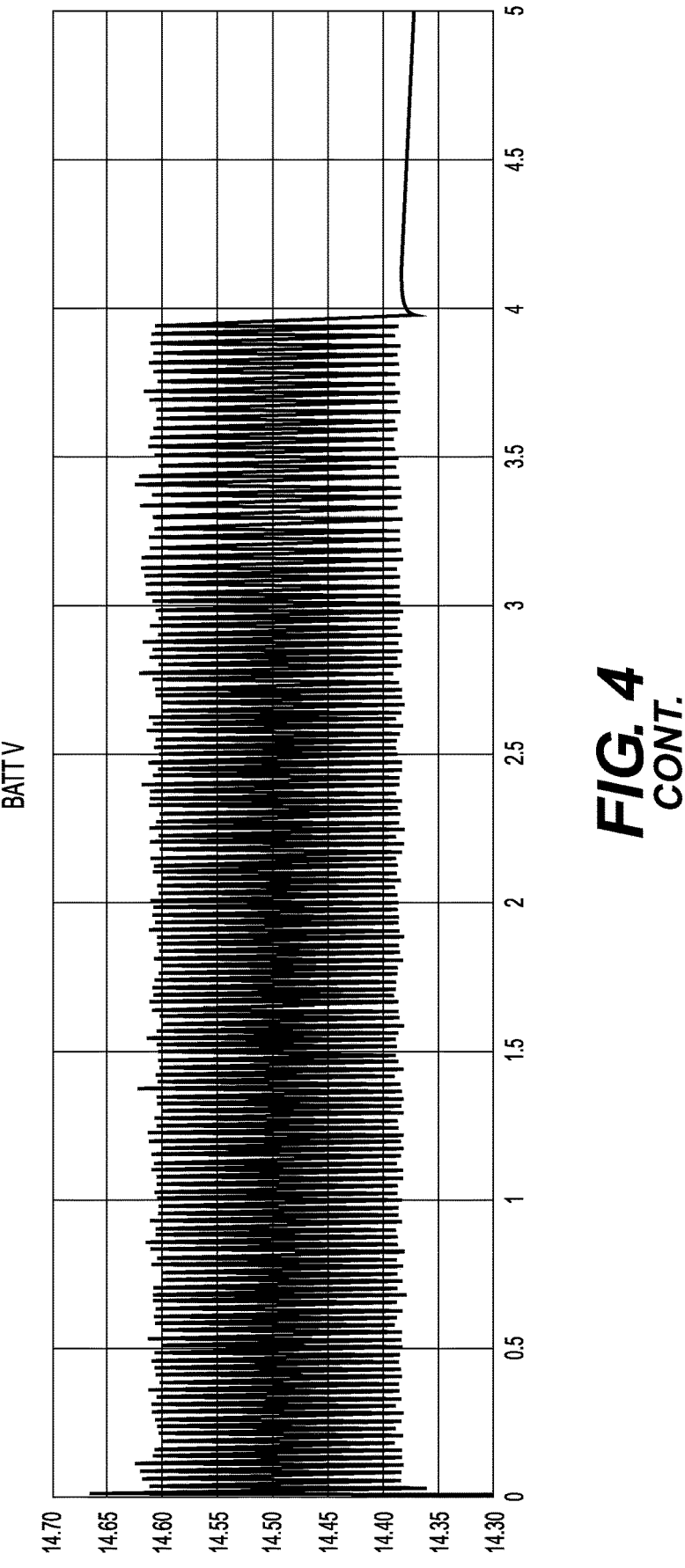
Figure 5:
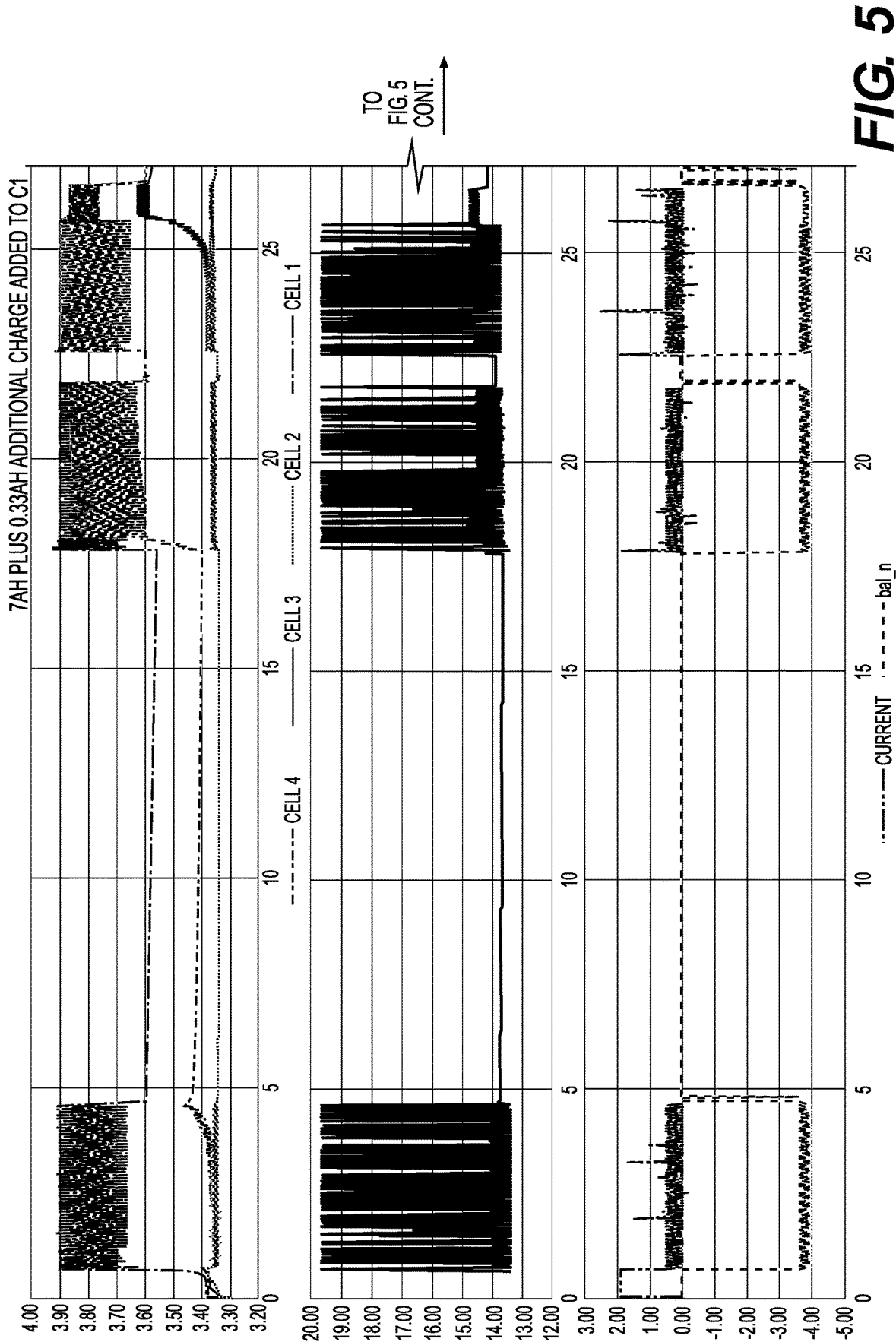
FIG. 5 is a graph showing G2 7 AH (amp hour) Battery with 0.33 AM added to Cell #1 (Took multiple Charge Cycles) (7 AH Plus 0.33 AH Additional Charge added to C1).
Figure 5:
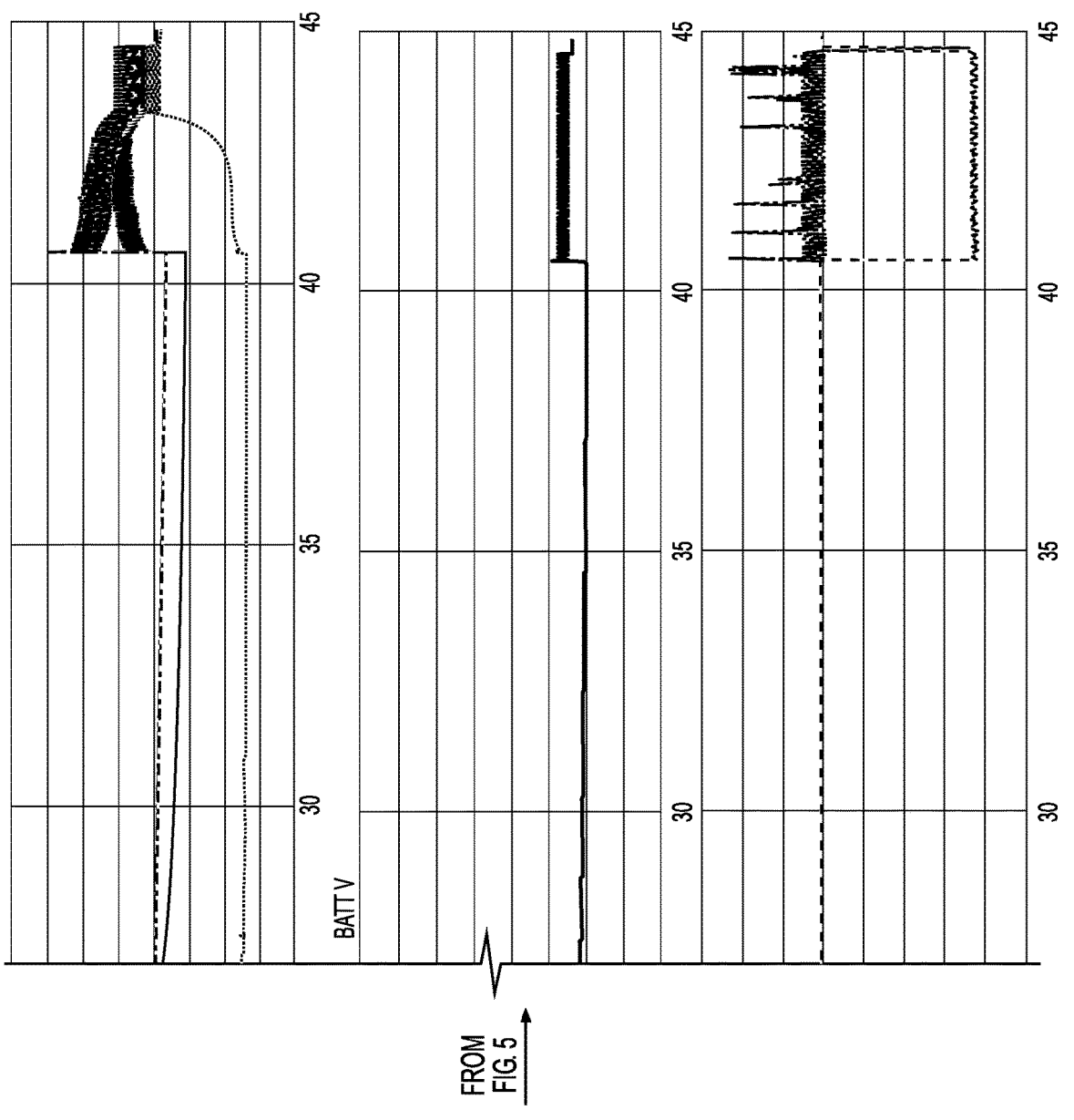
Figure 6:
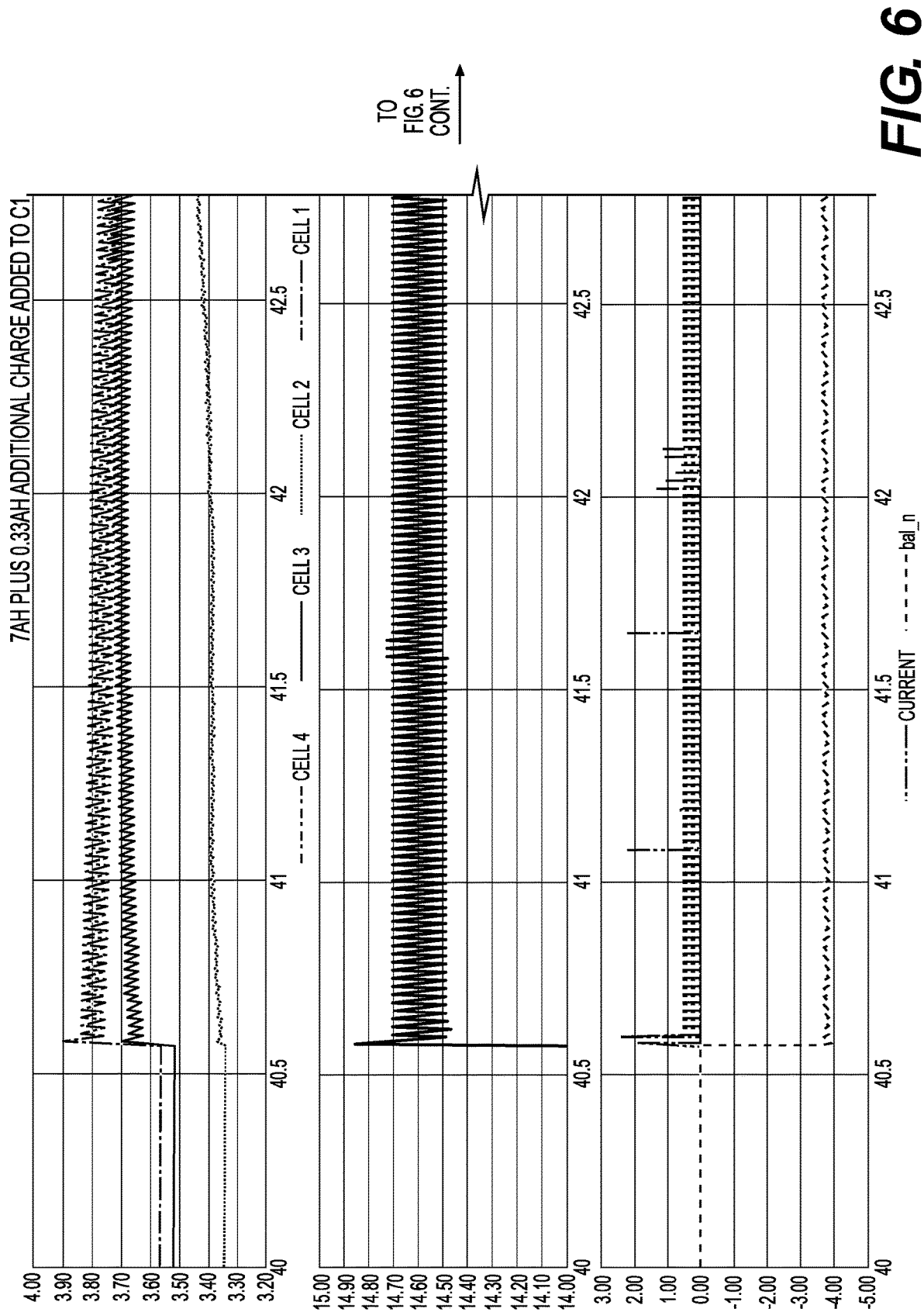
FIG. 6 is a graph showing Previous Chart—Zoomed in to 40-45 Hr Timeframe (7 AH Plus 0.33 AH Additional Charge added to C1).
Figure 6:
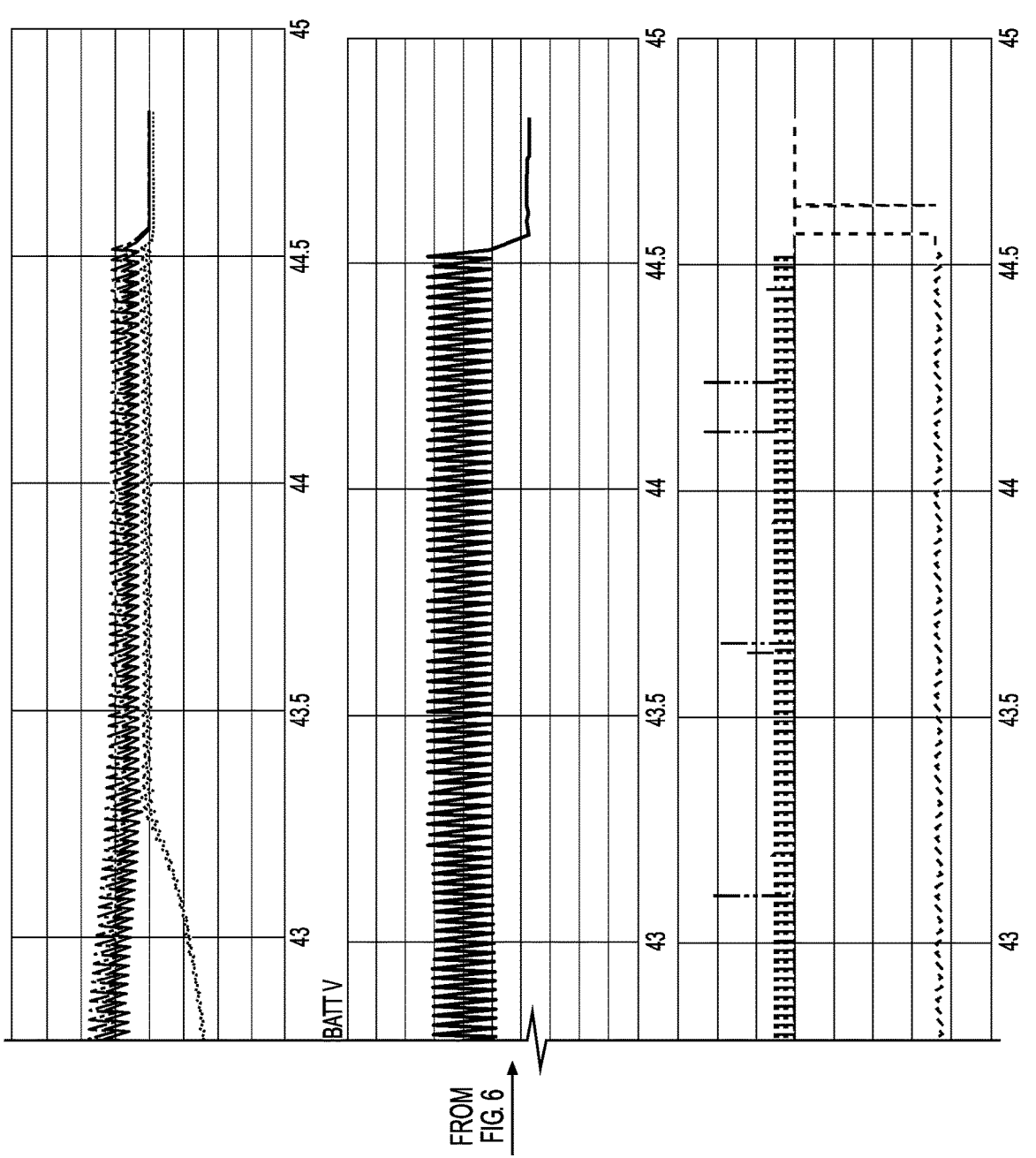
Figure 7:
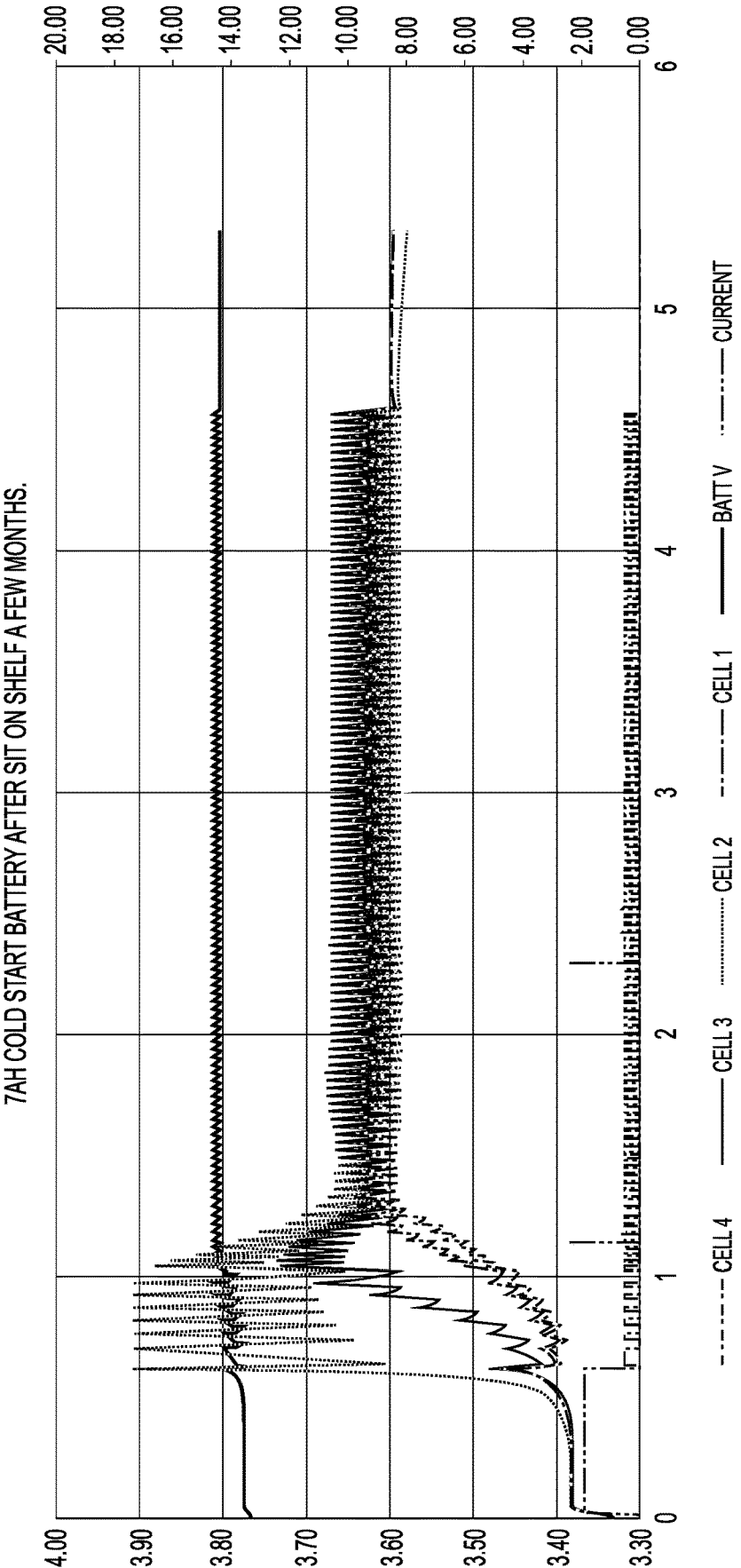
FIG. 7 is a graph showing G2 Cold Start Battery Charge Profile (Potential Typical Use Case) (7 AH Cold Start Battery after sitting on shelf a few months).
Figure 8:
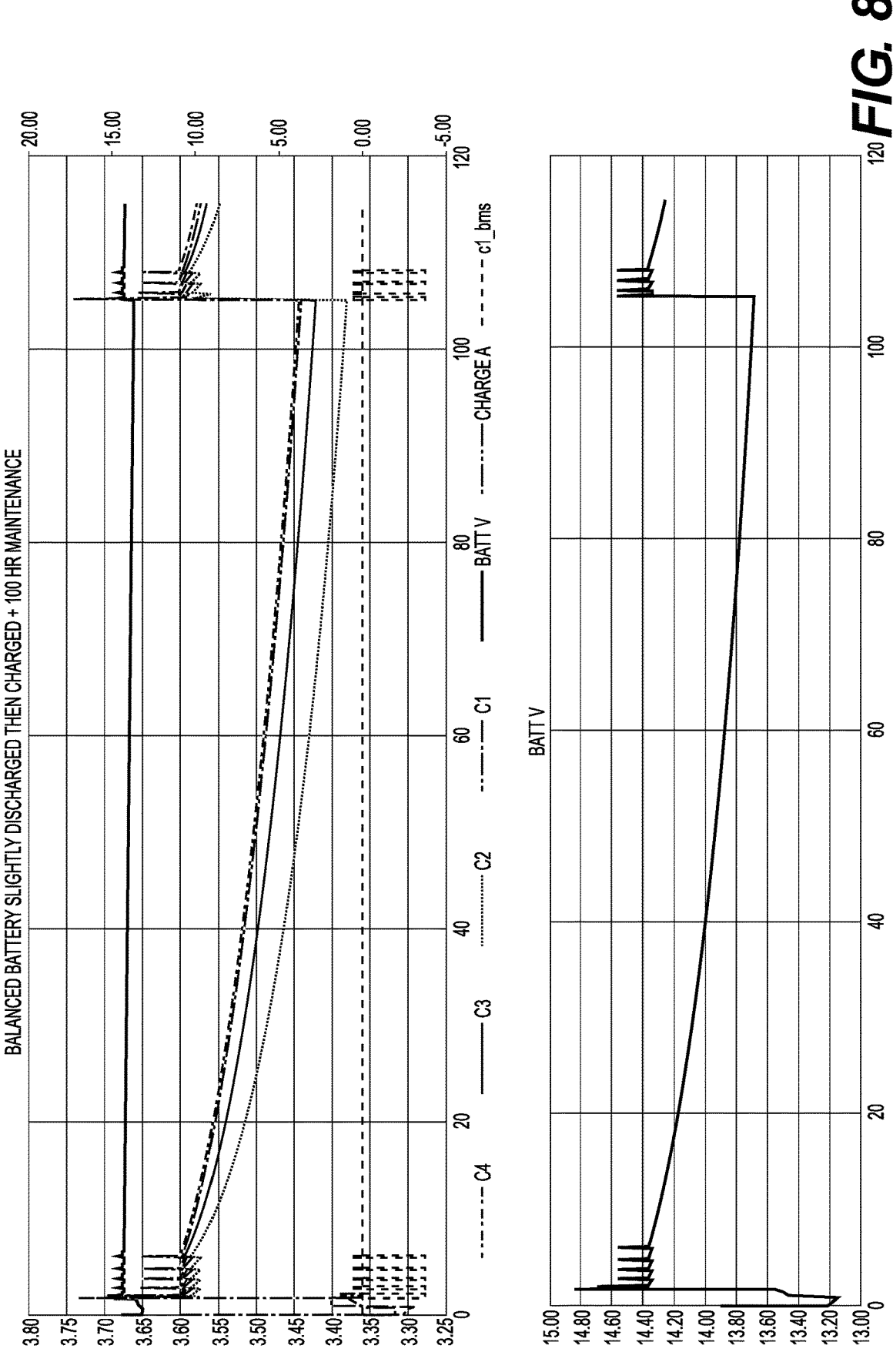
FIG. 8 is a graph showing G2 Short Discharge to Charge to Maintenance Charge (Balanced Battery Slightly Discharged Then charged+100 Hr Maintenance).
Figure 9:
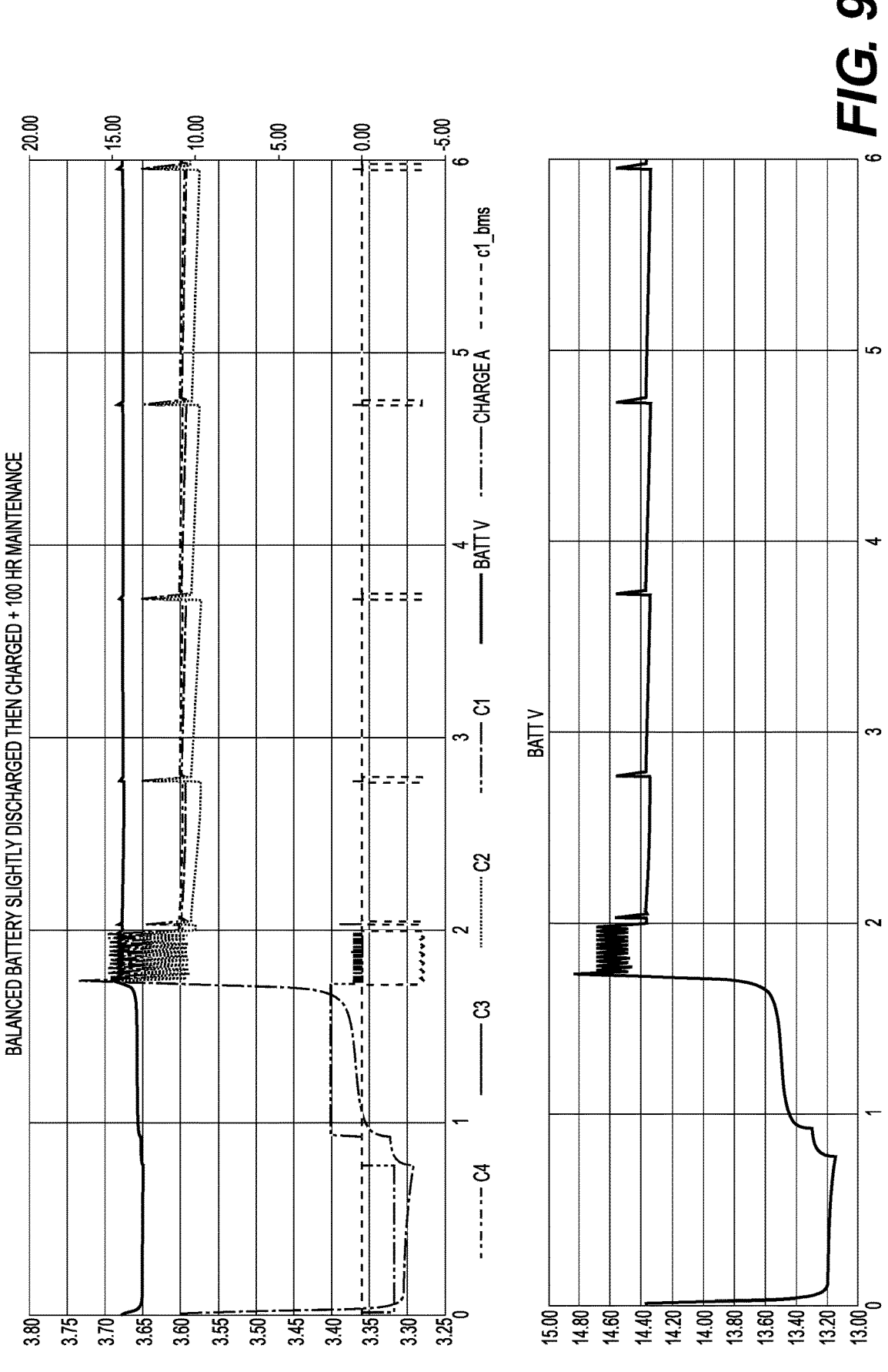
FIG. 9 is a graph showing Zoom in Timeframe of Previous Charge Log (Balanced Battery Slightly Discharged Then charged+100 Hr Maintenance).
Figure 10:
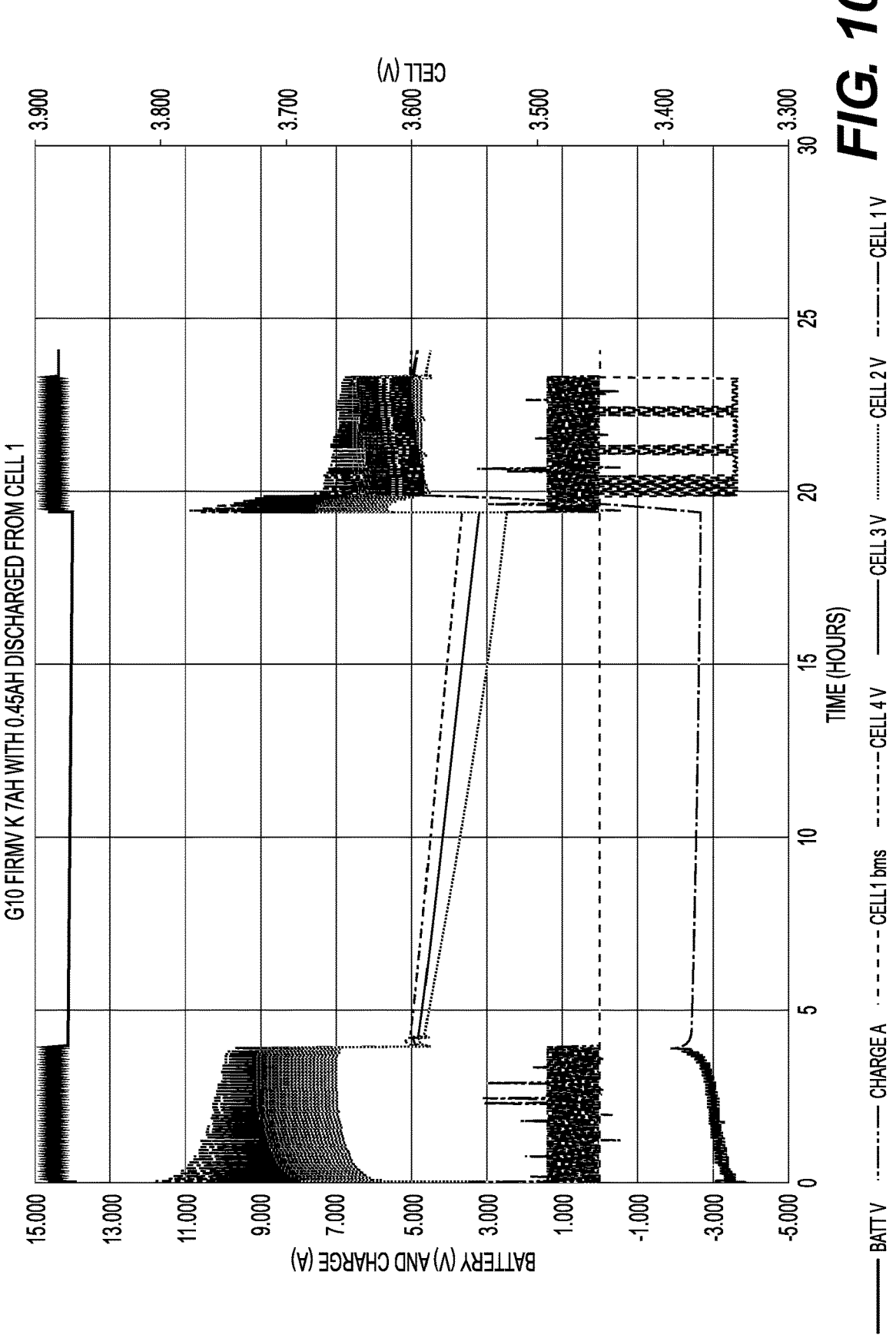
FIG. 10 is a graph showing G10 7 AH fully charged with 0.45 AH removed from Cell 1 (G10 Firmv K 7 AH with 0.45 AH discharged from cell 1).
Figure 11:
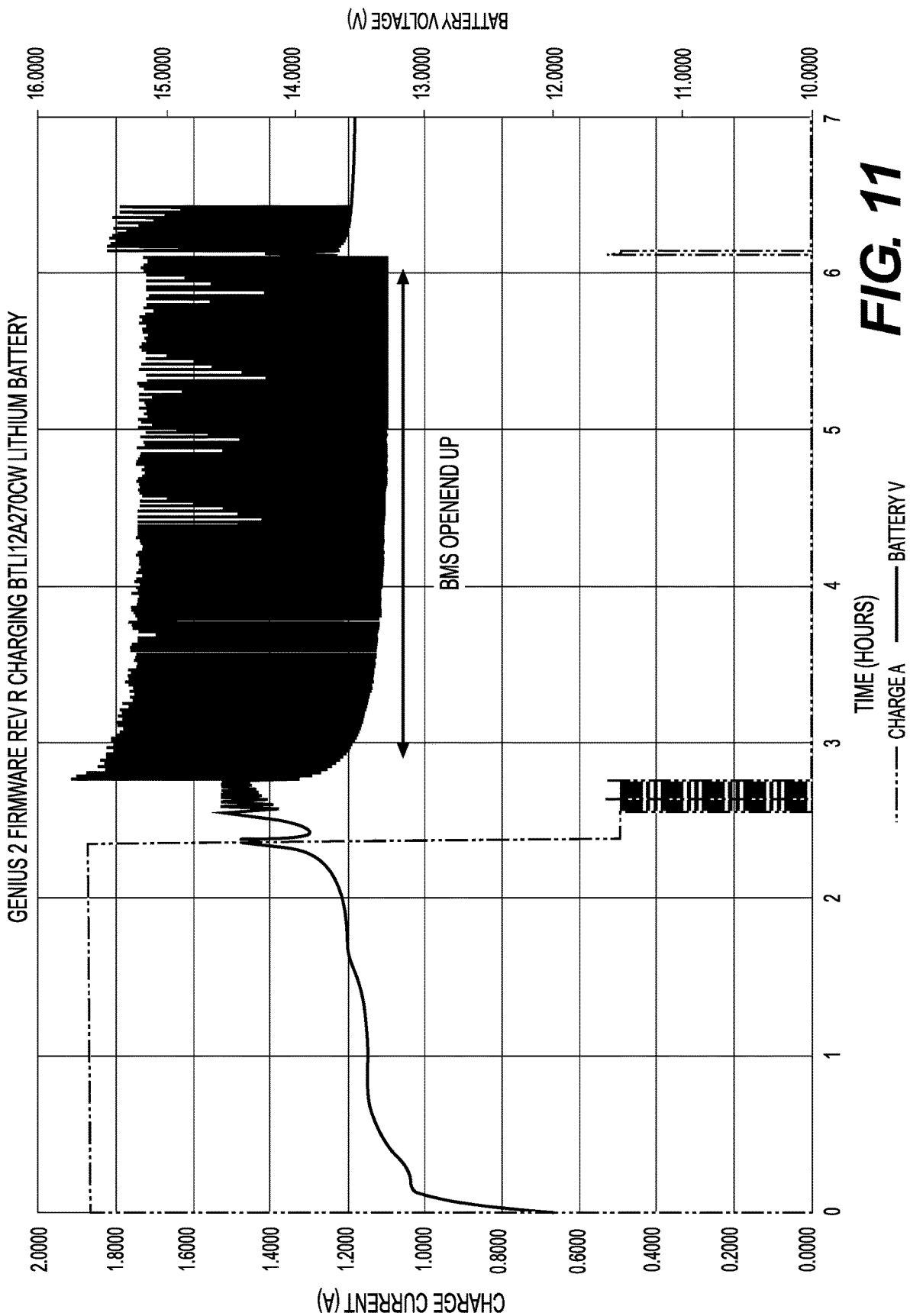
FIG. 11 is a graph showing Competitor Lithium Battery Charge Profile (Genius 2 Firmware Rev R Charging BTLI12A270CW Lithium Battery).
Figure 12:
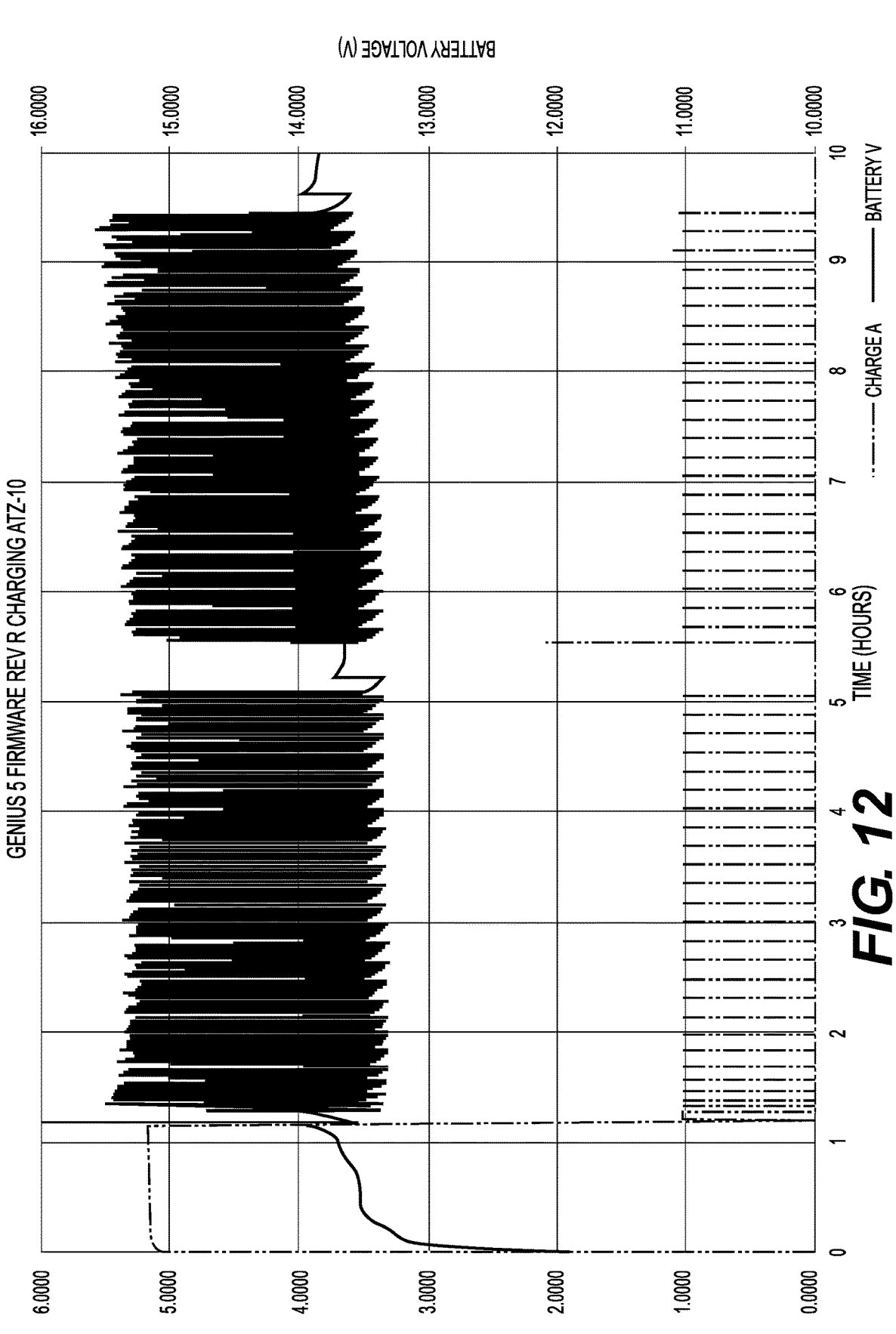
FIG. 12 is a graph showing Competitor Lithium Battery Charge Profile (Genius 5 Firmware Rev R Charging ATZ-10).
Figure 13:
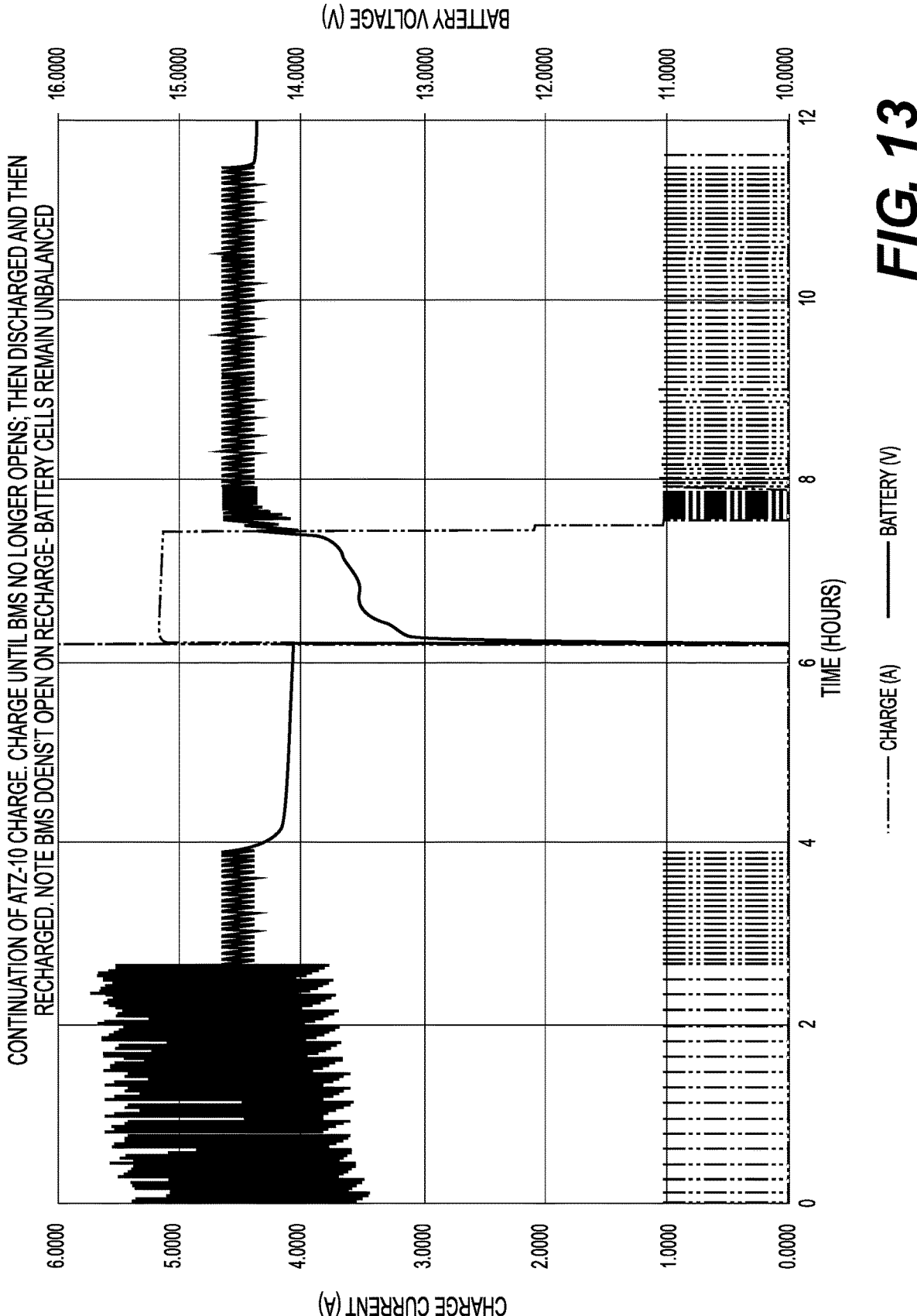
FIG. 13 is a graph showing Competitor Lithium Battery Charge Profile (Continuation of ATZ-10 Charge. Charge until BMS No Longer Opens; Then Discharged and then Recharged. Note BMS Doesn't open on Recharge—Battery Cells remained balanced).
Figure 14:
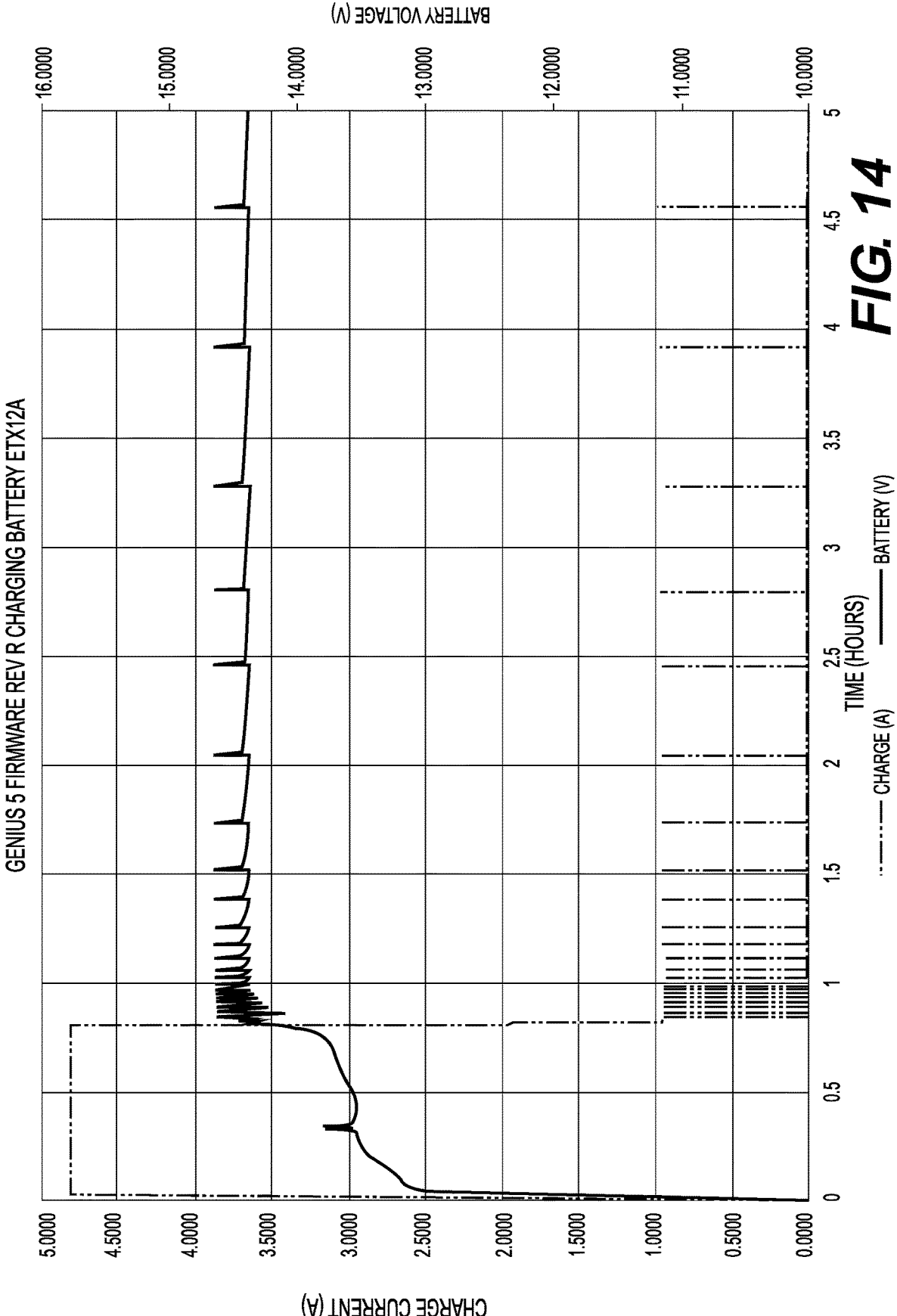
FIG. 14 is a graph showing Competitor Lithium Battery Charge Profile (Genius 5 Firmware Rev R charging battery ETX12A).
Figure 15:
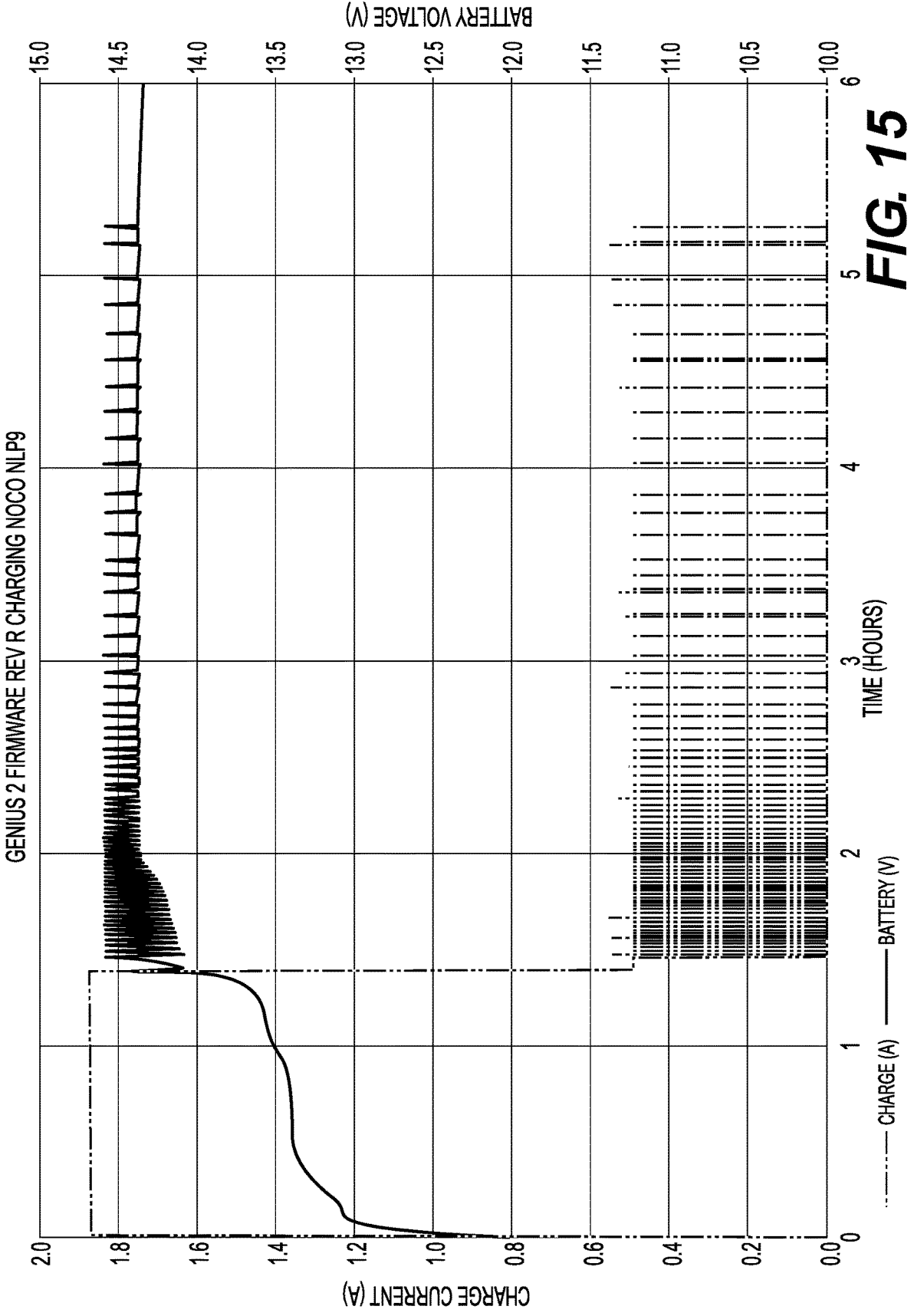
FIG. 15 is a graph showing NOCO Lithium Battery Charge Profile (Genius 2 Firmware Rev R Charging NOCO NLP9).
Figure 16:
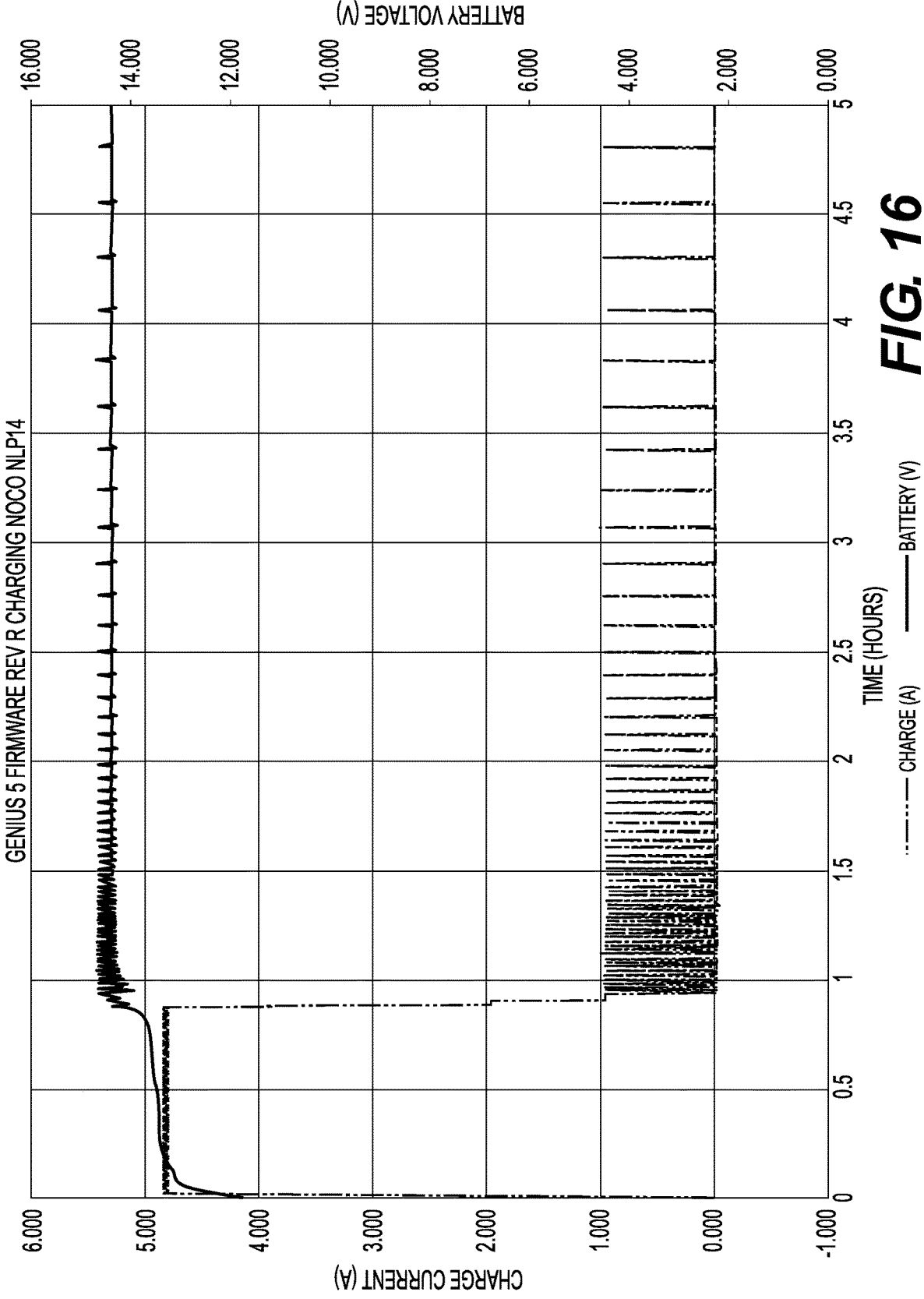
FIG. 16 is a graph showing NOCO Lithium Battery Charge Profile (Genius 5 Firmware Rev R Charging NOCO NLP14).
Figure 17:
FIG. 17 is a graph showing NOCO Lithium Battery Charge Profile Genius 2 Firmware Ver. S (Genius 2 Firmware Version 5 charging 7 AH Lithium with LCB-Cell 3 Imbalance).
Figure 18:
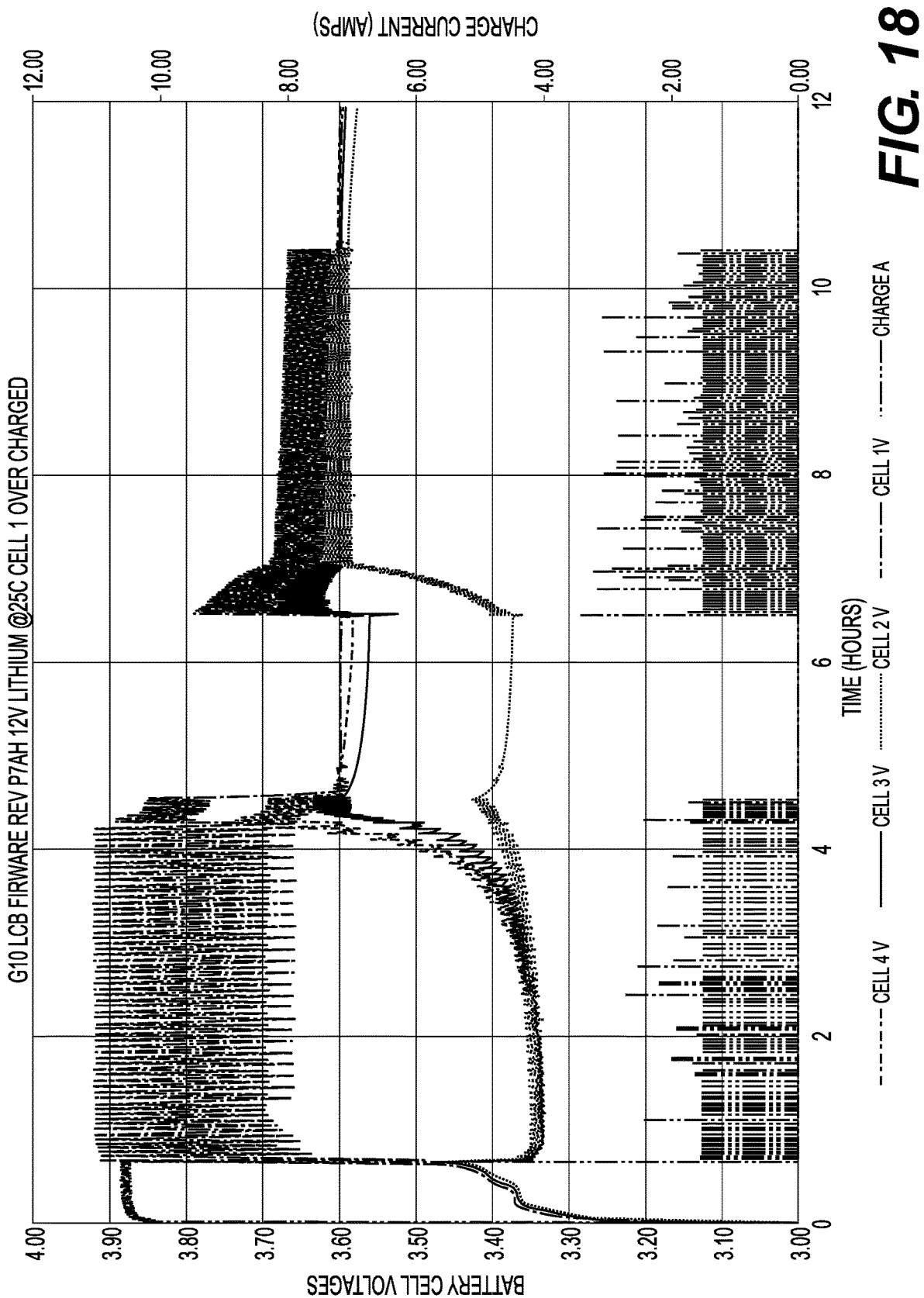
FIG. 18 is a graph showing NOCO Lithium Battery Charge Profile Genius 10 Firmware P (G 10 LCB Firmware Rev P 7 AH 12V Lithium @ 25 C Cell 1 Over Charged).

The Battery Management System (BMS) 28 is connected to the lithium ion rechargeable battery 20, as shown in FIG. 3.

The battery charger 10 is configured and/or programed to charge the lithium ion rechargeable battery 20 in a particular manner. For example, the battery charger 10 is provided with a lithium ion rechargeable battery cell balancing mode or feature (i.e. Lithium Cell Balance).

For example, the battery charge 10 operates as follows. If the lithium ion rechargeable battery voltage reaches the cut-off voltage for Lithium mode (e.g. 14.6V) while the battery charger is delivering current to the depleted or discharged lithium ion rechargeable battery, even in a soft start mode, the battery charger will enter the Lithium Cell Balance (LCB) mode, for example, four (4) hours. The Lithium Cell Balance (LCB) mode is indicated by turning off the 25%, 50%, 75% fuel gauge LEDs on the display of the battery charger while lighting the 100% LED (i.e. same as specific gravity optimization).

While in the Lithium Cell Balance (LCB) mode, the battery charger will turn off the charge current once the battery voltage reaches the cut-off voltage. The charger will continue to monitor the battery voltage and once it drops to 14.4V, the charger will resume charging at the lowest soft start current (e.g. one-half (½) of the lowest soft start current, if the temperature is below 0° C.). The battery charger will turn off and on while the battery voltage is increasing to 14.6V and then dropping to 14.4V multiple times. The battery charger will cut-off for a predetermined time interval (e.g. one (1) minute) after reaching 14.6V before the battery charger is allowed to turn on again, even if the battery voltage has dropped past 14.4V.

After a predetermined time interval (e.g. four (4) hours) in the Lithium Cell Balance mode, the battery charger will stop charging and indicate 100% on the fuel gauge on the display of the battery charger.

Lithium Cell Balance Mode with BMS Oscillations

While charging the lithium ion rechargeable battery (Lithium mode), if the Battery Management System (BMS) of the lithium ion rechargeable battery opens before the battery voltage reaches 14.6V as indicated by if the battery charger measures a voltage above the start voltage and below 14.6V, but cannot provide a charge current, the battery charger goes into Lithium Cell Balance mode and starts a four (4) hour timer. The fuel gauge then sequences to a breathing green 100% LED.

The battery charger shall keep polling the voltage of the lithium ion rechargeable battery, but instead of going to stand-by mode in-between polling attempts, the battery charger shall stay in Lithium Cell Balance (LCB) mode and the fuel gauge indicates a green 100% LED (e.g. a breathing green colored operating LED repeatedly glowing brighter and dimmer).

Once the battery charger hits this current balance mode, the Battery Management System (BMS) will be opening and closing randomly. The battery charger will continue to poll the voltage of the lithium ion rechargeable battery when the Battery Management System (BMS) closes the FET, once the FET is closed the battery charger will charge at the lowest soft start current (e.g. one-half (½) of lowest soft start current if below 0° C.).

If the lithium ion rechargeable battery's internal lithium ion battery cells equalize to the point where the Battery Management System (BMS) no longer opens and the battery voltage rises to 14.6 volts, the charger shall operate as described above, except the four (4) hour timer shall not be reset.

After the four (4) hours in the cell balance mode, the battery charger stops charging and indicates 100% on the fuel gauge on the display of the battery charger. If the battery charger ever detects that the battery voltage goes below the start voltage, the battery charger goes to stand-by mode.

The invention claimed is:

1. A lithium-ion rechargeable battery charging system with lithium cell balancing, the system comprising:

a lithium-ion battery comprising a plurality of battery cells connected together in electrical series and a battery management system (BMS), the battery management system (BMS) including a discharge switching circuit and a charge switching circuit, the BMS being configured to close the charge switching circuit to begin charging the lithium-ion battery from a battery charger, monitor a voltage of each of the plurality of battery cells in the lithium-ion battery, and upon determining that a voltage of one or more of the plurality of battery cells rises above an overvoltage threshold, open the charge switching circuit to stop charging the lithium-ion battery, connect one or more resistive loads to the one or more of the plurality of battery cells with a voltage above the overvoltage threshold, and close the discharge switching circuit to enable voltage from the one or more of the plurality of battery cells with a voltage above the overvoltage threshold to be discharged through the one or more resistive loads, wherein a voltage of the lithium-ion battery is detected to determine that the lithium-ion battery has not become disconnected from the battery charger when the charge switching circuit is opened by the BMS, wherein the voltage of the lithium-ion battery is periodically polled to determine when the BMS closes the charge switching circuit to continue charging the lithium-ion battery; and wherein upon a determination that a combined voltage of the plurality of battery cells has reached a threshold voltage, the plurality of battery cells transitions to being charged in a constant voltage charging mode to maintain a taper charge of the plurality of battery cells, the constant voltage charging mode emulated using a constant current battery charger by turning a charging current on and off to maintain the combined voltage of the plurality of battery cells within a voltage range.

2. The system of claim 1, wherein the voltage of the lithium-ion battery is detected across a diode of the charge switching circuit.

3. The system of claim 2, wherein the charge switching circuit includes a charge FET coupled in parallel with the diode.

4. The system of claim 1, wherein the discharge switching circuit includes a discharge FET coupled in parallel with a diode.

5. The system of claim 1, wherein the BMS is further configured to, upon determining that the voltage of one or more of the plurality of battery cells is at or under a safe threshold voltage, disconnect the one or more resistive loads from the one or more of the plurality of battery cells, open the discharge switching circuit, and close the charge switching circuit to continue charging the lithium-ion battery.

6. The system of claim 1, wherein the threshold voltage is 14.6 volts.

7. The system of claim 1, wherein the taper charge is maintained for a set period of time before charging is stopped.

8. The system of claim 1, wherein the voltage range is between 14.4 volts and 14.6 volts.

* * * * *